United States Patent [19]

Fusey

[11] 3,996,148
[45] Dec. 7, 1976

[54] BASIC DETERGENT FOR LIQUID LYES

[76] Inventor: Pierre Fusey, 8 Rue l'Abbe de l'Epee, Paris Veme, France

[22] Filed: July 25, 1975

[21] Appl. No.: 599,163

[30] Foreign Application Priority Data

July 25, 1974 France .............................. 74.25834

[52] U.S. Cl. .............................. 252/156; 252/142; 252/523; 252/525; 252/527; 252/544; 252/546; 252/548; 134/3
[51] Int. Cl.$^2$ .......................................... C11D 7/06
[58] Field of Search .......... 252/156, 523, 525, 142, 252/527, 544, 546, 548; 134/3

[56] References Cited

UNITED STATES PATENTS

| | | | |
|---|---|---|---|
| 2,691,636 | 10/1954 | Stayner | 252/527 |
| 3,072,502 | 1/1963 | Alfano | 134/3 |
| 3,166,444 | 1/1965 | Ehren et al. | 252/142 |
| 3,554,801 | 1/1971 | Kleiman | 134/3 |
| 3,661,787 | 5/1972 | Brown | 252/142 |
| 3,703,481 | 11/1972 | Barker | 252/527 |

OTHER PUBLICATIONS

Szmant, H. H. Organic Chemistry, N.J. Prentice–Hall, Inc. 1957, p. 297.
Rose et al. The Condensed Chemical Dictionary, N.Y. Reinhold Publ. Co. 1956, p. 662.

*Primary Examiner*—Mayer Weinblatt
*Attorney, Agent, or Firm*—Young & Thompson

[57] ABSTRACT

A process for the manufacture of a basic detergent comprising the reaction without heating, of carboxylic aliphatic diacid of $C_6$ to $C_8$, with a compound of nitrogen selected in the group consisting of ammonia and primary, secondary or tertiary aliphatic amines and aliphatic amino-alcohols. The detergent obtained is practically non-noxious.

5 Claims, No Drawings

BASIC DETERGENT FOR LIQUID LYES

It is known that Laws relating to pollution by sewer water require more and more that components of detergents shall not be noxious but biodegradable. An efficient detergent for mineral greases, which is not noxious but biodegradable, is practically non-existent. It is, therefore, necessary to limit the content of active elements in detergents by incorporating fillers, and this requires the use of more detergent and, therefore, the final discharge of just as much noxious elements in washing water. The fillers, even those not noxious consisting of mineral substances, detergents and bleaching and other agents insoluble in water, are found to be placed in suspension in washing water and make it turbid, and this can be considered as pollution.

The object of this invention is, therefore, to provide a basic detergent which is not noxious or very hardly so but is active against mineral, animal and vegetable greases and soluble in water.

The solution has been obtained by fixing on a fatty acid chain, therefore of a lipophilic kind, sufficiently short in order that the molecule obtained has a reduced molecular weight enabling it to be put into solution in water, the largest number possible of hydrophilic radicals with the presence in the molecule of CO groups increasing the detergent effect.

According to the invention, the process of manufacture of the basic detergent consists in causing to react without heating, carboxylic aliphatic diacid $C_6$ to $C_8$ with a compound of nitrogen chosen from the group consisting of ammonia and primary, secondary or tertiary aliphatic amines and aliphatic amino-alcohols.

Owing to the carboxylic diacid used as basic material, ammonium, amide or alcohol radicals, which are hydrophilic, can be fixed at the two ends of the chain, and these radicals are linked with the fatty acid chain through two CO groups. The molecular weight per hydrophilic radical is thus reduced, and this allows for the placing of the detergent into solution under high concentration.

The diacids $C_6$ to $C_8$ are adipic or sebacic acids, the non noxious character of which is well known, their salts being authorized as plasticizers for plastics for the foodstuff industry.

Aliphatic amines and aliphatic amino-alcohols are preferably those with a chain $C_1$ to $C_4$ and in particular mono-, di- and tri-methylamines, mono-, di- and tri-ethylamines, mono-, di- and tri-propylamines, mono-, di- and tri-butylamines and mono-, di- and tri-ethanolamines.

In case of reaction of the diacid with an amine or an amino-alcohol, this reaction is carried out with a molar excess of diacid and neutralization is ensured with ammonia to bring the pH to a value of 7 to 7.5.

In usual reactions between amines or amino-alcohols and acid, an acid halide is used, in particular an acid chloride, and this leads to the full salification of the hydrogens of the amines and the full esterification of the alcoholic radicals of the amino-alcohols. According to the invention and whilst acting only with an excess of acid, partial salification and esterification are obtained with possibly a quaternization of the nitrogen.

It may be possible to add to the carboxylic aliphatic diacid, a given quantity of an aliphatic carboxylic mono-acid with a straight or branched chain of $C_2$ to $C_8$ and in particular lactic acid, hexanoic acid or ethyl-2-hexanoic acid, so long as the molecules obtained remain soluble in water, possibly after increasing the pH to 8.5 to 9.

Besides ammonia, aliphatic amide or aliphatic amino-alcohol adipate or sebacate, the composition contains usual detergent agents, bleaching agents and optical blues.

According to another aspect of the invention and to make the detergent more easily biodegradable, a phospho-amino-lipid, in particular lecithin is added in the amount of 1 to 50% by weight.

A description will now be given of various examples of compounds according to this invention.

EXAMPLE 1

Ten parts by weight of adipic acid were reacted with approximately 10 parts by weight of ammonia at 22° Be to bring the pH of the reaction medium up to approximately 7.5.

The ammonium adipate obtained was dissolved in four times its weight of water. The solution was used in a washing machine to clean boiler-house work-clothes soiled by fuel oil.

The detergent action of the solution proved to be excellent.

EXAMPLE 2

The adipic acid of example 1 was replaced by 18 parts by weight of sebacic acid and a compound was obtained having substantially the same characteristics and properties.

EXAMPLE 3

14 parts by weight of adipic acid were reacted with 7.5 parts by weight of monoethylamine, and then ammonia at 22° Be was added to bring the pH of the solution up to 7.5.

The compound obtained was soluble in water and after putting into solution in four times its weight of water, the solution proved during tests to have an excellent detergent power with regard to hydrocarbons and mineral, animal and vegetable greases.

The process of Example 3 was repeated whilst replacing the adipic acid by sebacic acid and replacing in the various tests, the monoethylamine by di- or tri-ethylamine, mono-, di- or tri-methylamine, mono-, di- or tri-propylamine or mono-, di- or tri-butylamine, the acid still remaining in molar excess, and neutralization was effected with ammonia to bring the pH to 7.5.

The products obtained all had good detergent properties with regard to greases.

EXAMPLE 4

40 parts by weight of sebacic acid were reacted with 24 parts by weight of mono-ethanolamine, and then neutralized with ammonia to bring the pH to 8. After putting into solution in 100 times its weight of water, the solution was used to soak wiping rags soiled with grease. After 1 hour's soaking, the rags were rinsed in water, and this eliminated all the stains.

EXAMPLE 5

40 parts by weight of adipic acid were reacted with 20 parts by weight of triethylamine, and the pH was brought up to 7.5 with ammonia. The compound obtained in which the ethanolic radicals of the amine were partly esterified displayed in solution in water an excellent detergent power with regard to mineral, vegetable and animal greases.

EXAMPLE 6

18 parts by weight of monoethanolamine were added to 32 parts by weight of a mixture of 20 parts of sebacic acid and 12 parts of lactic acid. Ammonia was added to bring the pH up to 8.

The compound obtained was soluble in water and had good detergent properties.

Upon replacing in the above example, the lactic acid by 18 parts of hexanoic acid, a compound with similar properties was obtained.

EXAMPLE 7

A mixture of 20 parts of ethyl-2-hexanoic acid and 10 parts of adipic acid was prepared, and then neutralized with approximately 29 parts of ammonia at 22° Be to obtain a pH of 8.5 to 9. The mixture was then put into solution in 90 parts of water.

Boiler-house work-clothes were soaked in the compound and rinsed. All the oil and grease stains had disappeared by mere rinsing in water. The rinsing water contained a fine emulsion.

EXAMPLE 8

During the preparation of the above compounds and after neutralisation with ammonia, 5% of lecithin was added to the compound, and the washing water of objects soiled by mineral oils and greases was recuperated.

This water and washing water of Examples 1 to 7 were cultured with bacteria from soils polluted by hydrocarbons, and bacteria from river water. It was ascertained that the biodegradation of the hydrocarbons in the case of the compounds of Example 8 was approximately twice as fast than in the case of compounds of Examples 1 to 7, the economically acceptable proportions of sufficiently active lecithin being 2%.

The particular examples given above may be modified in numerous ways without departing from the scope of the present invention.

I claim:

1. A process for the manufacture of a detergent, comprising reacting a molar excess of a carboxylic $C_6$–$C_8$ hydrocarbon diacid without heating with a nitrogen compound selected from the group consisting of $C_1$–$C_4$ hydrocarbon amines and $C_1$–$C_4$ hydroxy amines, and neutralizing the resulting reaction product with ammonia to bring the pH to 7 to 7.5.

2. A process as claimed in claim 1, in which the reaction medium contains also $C_2$–$C_8$ straight or branched chain hydrocarbon carboxylic mono acid.

3. A process as claimed in claim 1, and adding to the reaction product after neutralization with ammonia, an effective amount of lecithin, said amount being effective to render the detergent biodegradable.

4. A process as claimed in claim 2, in which said mono acid is selected from the group consisting of lactic acid, hexanoic acid and ethyl-2-hexanoic acid.

5. A process as claimed in claim 3, said amount being 1 to 50% by weight.

* * * * *